June 26, 1962 W. F. BERCK 3,040,574
APPARATUS FOR METERING LIQUIDS HAVING ENTRAINED GASES
Filed Nov. 14, 1958 2 Sheets-Sheet 1
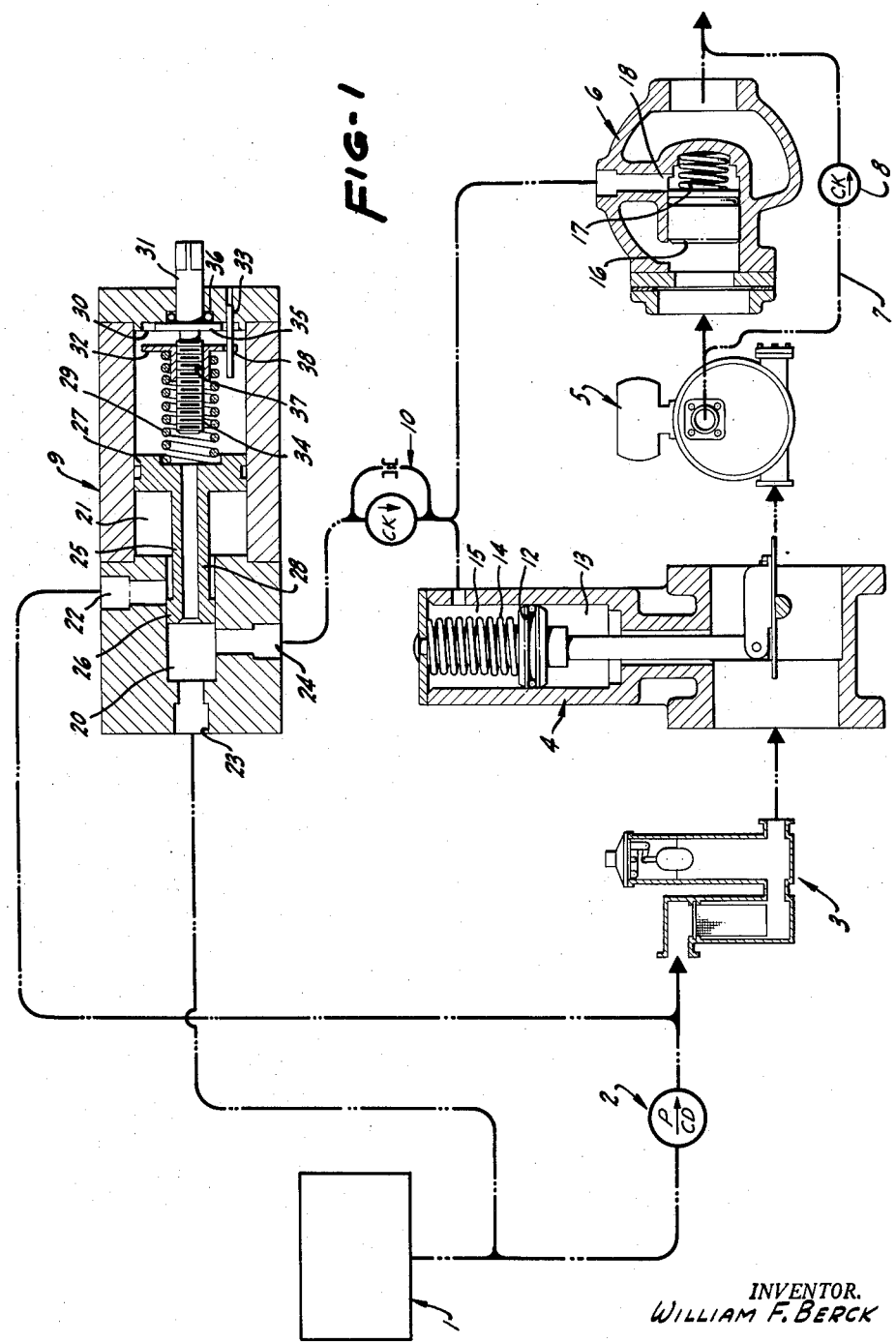
INVENTOR.
WILLIAM F. BERCK
BY
Mellin and Hanscom
ATTORNEYS June 26, 1962 W. F. BERCK 3,040,574
APPARATUS FOR METERING LIQUIDS HAVING ENTRAINED GASES
Filed Nov. 14, 1958 2 Sheets-Sheet 2
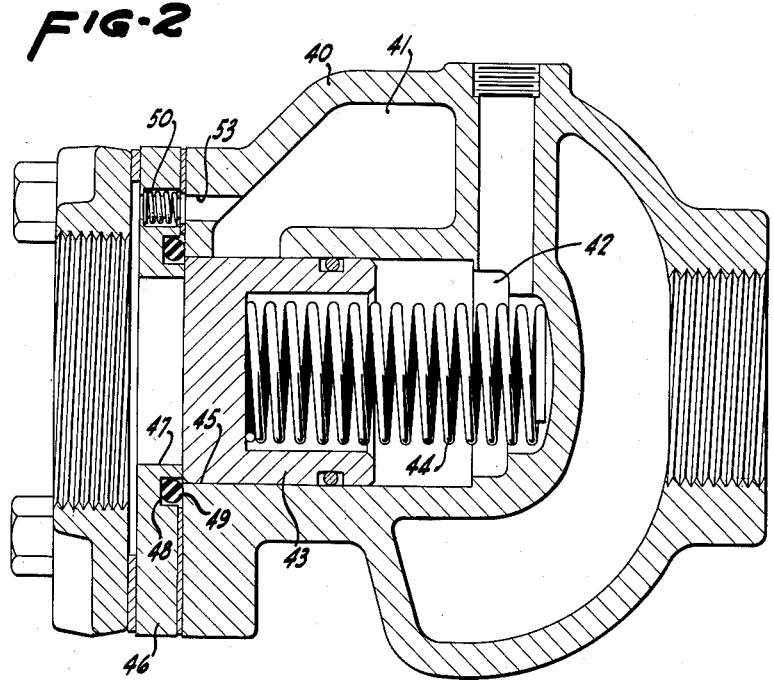
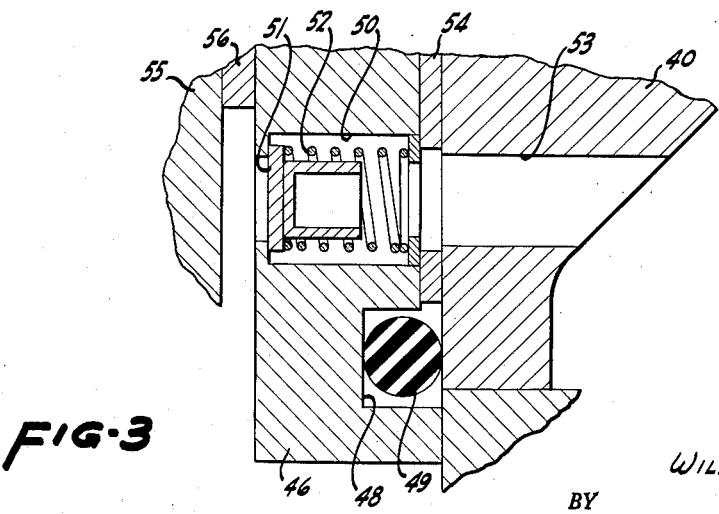
INVENTOR.
WILLIAM F. BERCK
BY
Mellin and Hanscom
ATTORNEYS United States Patent Office 3,040,574
Patented June 26, 1962

3,040,574
APPARATUS FOR METERING LIQUIDS HAVING ENTRAINED GASES
William F. Berck, Hayward, Calif., assignor to Ralph N. Brodie Company, San Leandro, Calif., a corporation of California
Filed Nov. 14, 1958, Ser. No. 773,977
7 Claims. (Cl. 73—200)

This invention relates to apparatus for use with fluid meters, whereby means is provided to check the flow in the metered flowline when an excess of free air or entrained gases is pumped into the system.

The prevention of false registration of fluid meters has been a continuing problem whenever free air or entrained gas is introduced into a meter flowline. The free air or other gas must be removed prior to the metering operation since the meter would otherwise register both the volume of liquid and the volume of entrained gases. Therefore, it is common practice to trap such entrained gases in an air eliminator chamber which is placed in the flowline upstream of the meter. A float member is disposed in this chamber and, as the gas is trapped and occupies a greater part of the chamber, the float descends on the surface of the liquid. When a predetermined amount of gas is collected, the float arrives at a predetermined position and opens a vent or air release valve at the top of the chamber, thereby allowing the gas so collected to escape.

If the amount of entrained air or gas is passed into the system and collected in the chamber at a faster rate than it can be vented, it will become necessary to shut off the flow through the meter to prevent overrunning of the air eliminator. It is customary to dispose a second float in the air eliminator chamber to operate a metering valve in the flowline; or, in the alternative, the same float could be employed to operate both the vent valve and the metering valve. If the gas is then collected faster than it can be vented, the second float (or the same float) will descend to a lower level and operate the metering valve to a closed position.

Such prior art devices as described are satisfactory as long as the flows in a metered flowline are no greater than 50 gallons per minute and the pump pressures do not exceed 50 pounds per square inch. However, in all phases of the petroleum industry it has been essential to increase the rate of handling petroleum products in order to check the rising costs of fluid transfers. New types of pumps are now available on the market, and in recent months the ability to produce pressures in tank truck equipment has far exceeded that which was at one time thought to be reasonable. As a consequence of this development, the speeds of tank truck deliveries has been greatly increased, and in many areas speeds of 75 gallons a minute are not unusual. In some areas there are tank trucks in use which are capable of delivering more than 100 gallons per minute, twice that for which prior art devices were designed.

Conventional apparatus which employs a float in the air eliminator to operate a metering valve are inadequate for handling modern standards of fluid delivery. For, when the supply tank becomes empty, huge quantities of air are passed rapidly into the system by the high pressure pumps. The air eliminator and its air release valve are incapable of handling such an immediate demand for air elimination, and quantities of air are pushed through the meter before the metering valve is closed.

It is to be noted that the conventional apparatus described above depends upon a change of the liquid level in the air eliminator to sense the presence of an over-accumulation of air. Therefore, such devices detect quantitative amounts of trapped air for operation of their respective metering valves. The float operated valves follow the liquid level as air enters the system, and with high rates of flow they respond too late with too little capacity to prevent air from passing through the meter.

U.S. patent application, Serial Number 758,242, teaches a new system for metering fluids wherein a device is employed for detecting the quantity of entrained air passing through a metered flowline. If the quality of the fluid is such that the percentage of entrained gas approaches a level where the rate of accumulation would exceed venting, one or more metering valves are actuated responsively to their closed positions thereby preventing all but a small quantity of fluid from flowing through meter. In contrast to the apparatus of other systems described (which detect quantitative amounts of trapped air in the air eliminator), this system does not depend on a build-up of entrained gases for operation of the metering valves. Upon the detection of a predetermined amount of entrained gas or free air in the flowing liquid, the metering valves will close almost instantly and well in advance of any over running of the air eliminator.

As disclosed in the above identified application, the metering valves were not tight seated but, rather, permitted a small flow across the valve means when closed. If the metering valves prevented all flow through the meter, there was a likelihood that the pump would become air bound. Therefore, some clearance was provided in the metering valves in order that the entrained air or gases could pass into the air separator and lower the liquid level therein by forcing it through the valve means. By so doing, the liquid level would be lowered to the point where the air release valve or vent will open and discharge the trapped air. Great quantities of air can then be forced through the pump without its becoming air bound since the air release valve is now open.

In most installations, the back pressure of the delivery hose and nozzle will stop all movement of the liquid after the air release valve has fully opened. However, under certain conditions of operation this downstream back pressure is insufficient to stop flow and this slow flow will continue until the air eliminator chamber blows dry. If this happens, the free air will enter the meter and cause false registration.

Therefore, it is one purpose of this invention to provide metering apparatus which detects the amount of entrained air passing through a metered flowline and prevents further flow when the amount of air entrainment reaches a predetermined level; the apparatus will prevent the system from becoming air bound and yet will stop all fluid flow through the meter at the proper time and under various operating conditions.

It is a second object to provide metering apparatus which eliminates entrained air, prevents the system from becoming air bound and will stop all fluid flow through the meter under various operating conditions.

Another object of this invention is to provide metering apparatus comprising a metering valve which is capable of being tight seated and a by-pass valve which permits a small quantity of fluid flow to prevent the system from becoming air bound but will operate to a closed position at the proper time to stop all flow through the meter.

A further object of this invention is to provide a liquid metering system for preventing the registration of entrained gases comprising a flowline having a meter therein; a tight seating valve means downstream of the meter; a loose seated valve means upstream of the meter; means upstream of the meter responsive to a predetermined amount of entrained gas passing through the flowline to operate both of the valve means; and a by-pass valve in a passageway around the tight seating valve which permits a small quantity of fluid flow to prevent the system from becoming air bound but will operate to a closed position at the proper time to stop all flow through the meter.

Other objects and advantages of this invention will be suggested by the description and drawings.

Referring to the drawings:

FIG. 1 is a partly schematic illustration of the flow system described, showing the interrelationships of the various apparatus, with certain devices shown in section.

FIG. 2 is a sectional view of a preferred arrangement of a check valve disposed in a by-pass around a tight seating valve for use in this invention.

FIG. 3 is an enlarged fragmentary sectional view of the structure shown in FIG. 2.

Referring to FIG. 1 of the drawings, fluid is drawn from a supply tank 1 by a pump 2 and is normally forced through a flowline which includes gas separator and eliminator 3, a first valve means 4, fluid meter 5 and a second valve means 6. Passageway 7 is connected to the flowline around the second valve means 6, thereby providing an alternate passage (or by-pass) for the metered fluid. A by-pass valve 8 is disposed in passageway 7 and, being biased closed, normally prevents a flow of the fluid around the second valve means 6. An operating means 9 and 10 functions responsively to a predetermined amount of entrained gas passing through the flowline and operates first valve means 4 and second valve means 6 to closed positions. In general, then, some or all of this apparatus may be utilized in a system for metering liquids to prevent false registration of gases; the apparatus will prevent the system from becoming air bound and yet will stop all fluid flow through the meter at the proper time and under various operating conditions.

Air eliminator 3 is similiar to those in prior art devices and, as shown, comprises a strainer basket and the conventional trap chamber with float operated air release valve. It will be noted that the air eliminator is connected upstream of the meter to intercept and collect the entrained air or gas as it passes through the flowline. When an amount of gas is collected and the liquid level descends to a predetermined level, a float member will actuate an air release valve to open and discharge or vent the accumulated gas.

Fluid pumps characteristically lose efficiency when air or entrained gases are acted upon, and this is true for even the most efficient designs available today. The loss in efficiency is attributable to the difference in viscosity between a liquid and that liquid with entrained air. A change in the viscosity results in a change in the slippage characteristic of the pump, and, hence, also its efficiency. Since there is more slippage when either free air or entrained air enters the pump, the efficiency correspondingly decreases and the pressure output immediately drops.

Pump 2 is utilized, therefore, to detect the quantity of entrained gas passing through the flowline and to produce a signal in response thereto. If the percentage of entrained air passing through the pump increases, the efficiency and output pressure of the pump decreases. The resulting decrease change in flowline pressure is detected by the operating means 9 and 10 which, in turn, actuates the valve means 4 and 6 to their respective closed positions.

The operating means shown is responsive to a predetermined level of pressure in the flowline and comprises a pressure sensitive shuttle valve 9 and a flow control valve 10. In combination with pump 2, which detects the quality of fluid, the operating means and pump consist of a means responsive to a predetermined amount of entrained gas to operate the valve means 4 and 6.

Shuttle valve 9 comprises a housing having a first cylindrical chamber 20 and a second cylindrical chamber 21, said chambers being axially connected to form a continuous fluid passageway. Three passages 22, 23 and 24 are also formed in the housing, each passage connecting with chamber 20 from without and opening into the chamber at spaced axial distances.

A tubular valve element 25, which defines an inner conduit, is disposed in the housing with a first cylindrical head portion 26 slidably mounted in chamber 20. A second cylindrical head portion 27 is slidably mounted in chamber 21 and is connected to the first head portion by a reduced body portion 28. The head portion 27 being much large than head portion 26, fluid pressure entering passage 22 from the pressurized flowline will exert greater force on the larger head and tend to drive the valve element into chamber 21. However, a spring biasing means 29, comprising a coiled spring, as shown, is disposed near the inner end 30 of the chamber 21 and is compressed between the head portion 27 and a spring adjusting means.

The adjusting means is mounted in the inner end 30 and comprises a rotatable shaft 31, a spring seating plate 32, and a rotational restraining pin 33. The shaft is supported on the housing, one end accessible from without and the other end projecting axially into the second chamber and provided with a threaded portion 34. A disk collar 35 is formed integrally with the shaft, or, in the alternative, may be rigidly connected thereto, limiting outward axial movement of the shaft. Between collar 35 and inner end 30 is a sealing means 36 which prevents the escape of fluid and loss of fluid pressure.

Spring seating plate 32 is formed like a collar and has a threaded hole 37 mating with the threaded portion 34 on the shaft. In addition, an opening 38 is provided in the plate for receiving the rotational restraining pin which protrudes from the housing into the second chamber.

In operation, the spring of this shuttle valve is adjusted by rotating the shaft 31. Since the seating plate is restrained from rotational movement by pin 33, the mating threads of plate and shaft cooperate to extend or retract the seating plate in an axial direction and thereby perform adjustments on the compression spring 29. Adjustment is made to position the valve element 25 as shown in FIG. 1 under normal conditions.

With pump 2 supplying its normal pressure, the valve element 25 is balanced in the position shown in FIG. 1, passage 24 then being in open communication with passage 23. Since passages 24 and 23 are respectively connected to flow control valve 10 and the suction side of the pump, the fluid pressure used to operate the valves 4 and 6 to close is vented to the low pressure side of the flowline. If the fluid pressure source applied via passage 22 is decreased below a predetermined level, the spring bias 29 overcomes the force of liquid pressure and moves the valve element 25 to the left until head portion 26 abuts passage 23. If the valve element occupies such a position, the flowline pressure would be directed from passage 22 into chamber 20; fluid would circulate about the reduced body portion 28 and be applied through passage 24 to operate the valves 4 and 6 to their closed position.

It will be noted that the tubular valve element is constructed without seals of any sort in order that it will move freely and very quickly under small changes in pressure. The slippage which occurs across head portion 27 drains back through the center of the valve element to the suction side of the pump. The small amount of fluid which passes between head portion 26 and chamber 20 drains directly into the suction passage 23.

The flow control valve 10 is of conventional design, its purpose being to allow a free flow of fluid toward the valve means 4 and 6 but to restrict the outflow of fluid therefrom. As will be more fully explained below, it is not desirable to open valves 4 and 6 too quickly after they have once been operated closed. Therefore, valve 10 restricts the return flow and delays the opening of valves 4 and 6. A flow control valve which is satisfactory for this purpose is manufactured by Modernair, 400 Preda Street, San Leandro, California.

First valve means 4 is illustrated as a butterfly type valve which is designed to be loose seating. That is, when the valve is closed it will still pass a small amount of fluid. The valve is operated between open and closed positions by the unbalance of pressures exerted upon the piston 12 by fluid pressure from the flowline in chamber 13, by the pressure of biasing spring 14, and by the fluid pressure in chamber 15 (controlled by the operating means 9 and 10). The particular details of the valve shown are not part of this invention, and other valves which are loose seating may also be used. For best results, the loose seating valve 4 is disposed upstream of the meter 5 and downstream of the air eliminator 3. The valve is operated between open and closed positions by the operating means 9 and 10 which functions responsively to a predetermined amount of entrained gas.

Second valve means 6 is also actuated by the operating means 9 and 10; but, since this valve is tight seating, it will positively shut off flow therethrough upon being actuated to its closed position. A suitable valve for this purpose is shown in FIG. 1, which is operated between open and closed positions by the unbalance of pressures exerted upon the piston 16 by biasing spring 17, fluid pressure in chamber 18 (controlled by the operating means 9 and 10), and the flowline pressure on the piston head. It will be noted that valve means 6 is illustrated as a combination valve; that is, the valve element or piston 16 is operated by a biasing spring, and is therefore a pressure differential valve, but it is also operated positively to close by a source of fluid. These functions may be performed separately by separate valve devices, and the illustrated embodiment is only a preferred form of apparatus.

When pump 2 is full of liquid and is operating at its rated pressure for this installation, the shuttle valve is positioned as shown in FIG. 1, whereby chambers 15 and 18 are vented to the suction side of the pump through the restricted side of the flow control valve 10, passage 24, and out passage 23. A differential pressure across the pistons 12 and 16 overpowers their respective spring bias and opens each valve, permitting free fluid flow to and from the meter 5. If the supply tank becomes empty, or whenever a predetermined mixture of liquid and air enters the pump, the efficiency of the pump changes, as described above, and results in a reduction in flowline pressure. Even a small amount of air will produce a pressure drop of two to four pounds; and, since the shuttle valve 9 is sensitive to small changes in pressure, it responds instantly and spring 29 moves valve member 25 to the left, placing head portion 26 between the openings of passages 23 and 24. The flowline pressure is then transmitted from passage 22 to passage 24, through the free passage portion of flow control valve 10 and into the respective operating chambers 15 and 18. The fluid pressures on either side of pistons 12 and 16 balance and the respective bias means 14 and 17 rapidly close each valve means. This sequence of operation transpires before any air enters the meter.

When liquid from a newly opened storage compartment now enters pump 2, the pump's efficiency rises and eventually reaches a predetermined operating pressure. The shuttle valve responds thereto and takes the position of FIG. 1, allowing the pressure from chambers 15 and 18 to be bled off as previously described. But, since the bleeding of the fluid must pass through the restricted portion of flow control valve 10, opening of the valves 4 and 6 is retarded. If the valves were permitted to open the instant the predetermined operating pressure were reached, some entrained gases might by-pass the air eliminator and be metered. Retarding the opening of valves 4 and 6 allows sufficient time for the air eliminator to trap and remove all entrained air.

Since the second valve means 6 is tight seated, it is possible that if no other apparatus were provided, the pump would become air bound. The problem will arise if the liquid in air eliminator 3 does not drop to a level permitting float actuation of the air release valve. Once the air release valve is opened, the flowline becomes vented and the pump can then force great quantities of air into the flowline without becoming air bound.

This difficulty was obviated in U.S. patent application Serial No. 758,242, since the valve means 6 was made loose seated, whereby a small amount of liquid was bled through the system until sufficient air was collected in the trap chamber of the air eliminator to open the air release valve. In most installations, the back pressure of the delivery hose and nozzle will stop all movement of the liquid after the air release valve has fully opened. However, under certain conditions of operation the downstream back pressure is insufficient to stop the slow flow, and the flow will continue until the air eliminator chamber blows dry. Then, free air enters the meter and causes false registration.

The present invention includes a valve means which is tight seated and, therefore, provision must be made to insure the opening of the air release valve. As illustrated in FIG. 1, a by-pass or passageway 7 is provided around the tight seating valve 6; and, a check valve 8 is disposed therein, and, being biased closed, it normally prevents fluid flow through the passageway. A preferred embodiment of this invention is shown in FIGS. 2 and 3 wherein the by-pass 7 and check valve 8 are unitized.

The differential valve of FIG. 2 has a body 40 which defines a flow chamber 41 and an inner piston cylinder 42. A piston 43 is disposed in the cylinder and is urged outwardly by a spring 44 toward an opening 45 in the body. A valve housing collar plate 46 having an annular opening 47 is held in abutting relation to the valve body with openings 45 and 47 substantially axially aligned. The opening 47 is somewhat smaller than opening 45, and circumscribing the opening 47 is a groove 48 which mates with the peripheral edge of opening 45. A sealing ring 49 is provided in groove 48. The above mentioned piston 43 fits closely within the opening 45 and, urged by spring 44, it will seat against collar plate 46.

Collar plate 46 is provided with a valve recess and passage 50 in which is housed a check valve comprising a valve element 51 and spring bias 52. Valve recess and passage 50 is aligned with a passage 53 in valve body 40, which fluidly connects to the inner flow chamber 41. A gasket member 54 is employed between the collar plate and valve body to prevent leaks at the junction of the passages. The collar plate is secured in place by a retaining plate 55 with a second gasket member 56 provided between the plates. Gasket 56 has sufficient width to provide a passage between plates 46 and 55 as shown in FIG. 3, and thereby a by-pass or passageway exists from the front of piston 43 to the inner flow chamber 41.

Now, if the valve means 4 and 6 close (and if the air release valve remains closed), the check valve 8 permits a flow around the tight seating valve, thereby draining the air eliminator until the air release valve opens. The check valve is biased closed with a back pressure which closes the by-pass after the air release valve opens. Thus, the bias will be strong enough to close the valve tight against the pressure in the flowline when pumping air, independently of any back pressure obtained in other installations from delivery hose or nozzle, etc., provided the air release valve is open. Should the air release valve be closed, the bias will be overcome by the flowline pressure and the valve will open, permitting fluid to be bled through the first valve means 4 and the meter 5.

With the above described apparatus, it is possible to prevent the pump from becoming air bound, and yet, means are provided to stop all flow through the meter at the proper time and under various operating conditions. Alternate arrangements could be provided for the by-pass and still retain many of its advantages. But, the system is most effective when the upstream connection of the by-pass is downstream of the meter, since even the small flows which occur while bleeding the flowline are registered. Any error which would result from metering such small flows of fluid would be on the plus side, and this will compensate for the minus error caused by finely divided air bubbles which fail to separate and be trapped in the air eliminator.

After considering the embodiment described herein, persons skilled in the art will understand that variations may be made without departing from the principles disclosed; and the use of any structures or arrangements that are properly within the scope of the appended claims is contemplated.

Having thus described my invention, what I claim and desire to secure by Letters Patent is:

1. In a liquid metering system for preventing the registration of entrained gases, the combination comprising a flowline having a meter therein; a valve means connected in said flowline and operative between open and closed positions, said valve means being tight seating to positively shut off the flow in the flowline upon being actuated to its closed position; a passageway around said valve means forming a by-pass for a small flow of fluid; a check valve in said passageway; and means upstream of said meter responsive to a predetermined amount of entrained gas in said flowline to operate said valve means; whereby the check valve will be closed when entrained gas is being bled from said flowline but is opened by the flowline pressure when said valve means is closed and the flowline cannot be bled of entrained gases.

2. A liquid metering system for preventing the registration of gases comprising a flowline having a meter therein; means upstream of said meter to separate and eliminate gases; a valve means connected in said flowline and operative between open and closed positions, said valve means being tight seating to positively shut off the flow in the flowline upon being actuated to its closed position; a passageway around said valve means forming a by-pass for a small flow of fluid; and a check valve in said passageway, said check valve being biased toward a closed position but operated to an open position by a predetermined pressure upstream of said meter; whereby the check valve will be closed when entrained gas is being bled from said flowline but is opened by the flowline pressure when said valve means is closed and the flowline cannot be bled of entrained gases.

3. A liquid metering system for preventing the registration of gases comprising: a flowline having a meter therein; a valve means connected in said flowline and operative between open and closed positions, said valve means being tight seating to positively shut off the flow in the flowline upon being actuated to its closed position; a passageway around said valve means forming a by-pass for a small flow of fluid; a check valve in said passageway, said check valve being biased toward a closed position; means upstream of said meter to separate and eliminate gases; and means responsive to a predetermined amount of gas in said flowline for operating said valve means; whereby the check valve will be closed when entrained gas is being bled from said flowline but is opened by the flowline pressure when said valve means is closed and the flowline cannot be bled of entrained gases.

4. A liquid metering system for preventing the registration of gases comprising: a flowline having a meter therein; means upstream of said meter to separate and eliminate gases; a valve means connected in said flowline and operative between open and closed positions, said valve means being tight seating to positively shut off the flow in the flowline upon being actuated to its closed position; a passageway around said valve means forming a by-pass for a small flow of fluid; a check valve in said passageway, said check valve being biased toward a closed position; and means responsive to a predetermined pressure upstream of said meter for operating said valve means; whereby the check valve will be closed when entrained gas is being bled from said flowline but is opened by the flowline pressure when said valve means is closed and the flowline cannot be bled of entrained gases.

5. A liquid metering system for preventing the registration of gases comprising: a flowline having a meter therein; a valve means connected in said flowline and operative between open and closed positions, said valve means being tight seating to positively shut off the flow in the flowline upon being actuated to its closed position; a passageway around said valve means forming a by-pass for a small flow of fluid; a check valve in said passageway, said check valve being biased toward a closed position; means upstream of said meter to separate and eliminate gases from said flowline and having an air release valve actuable to open after accumulating a predetermined quantity of gas; and means responsive to a predetermined amount of gas in said flowline for operating said valve means; whereby the check valve will be closed when entrained gas is being bled from said flowline but is opened by the flowline pressure when said valve means is closed and the flowline cannot be bled of entrained gases.

6. A liquid metering system for preventing the registration of entrained gases comprising: a flowline having a meter therein; a valve means connected in said flowline downstream of said meter and operative between open and closed positions, said valve means being tight seating to positively shut off the flow in the flowline upon being actuated to its closed position; a passageway around said valve means and connected to said flowline with its upstream junction downstream of said meter, said passageway forming a by-pass for a small flow of fluid; a check valve in said passageway, said check valve being biased toward a closed position but operated open by a predetermined upstream head pressure; means upstream of said meter to separate and eliminate gases from said flowline and having an air release valve actuable to open after accumulating a predetermined quantity of gas; and means responsive to a predetermined amount of gas in said flowline to operate said valve means; whereby the check valve will be closed when entrained gas is being bled from said flowline but is opened by the flowline pressure when said valve means is closed and the flowline cannot be bled of entrained gases.

7. A liquid metering system for preventing the registration of entrained gases comprising: a flowline having a meter therein; a first valve means connected in said flowline upstream of said meter and operative between open and closed positions, said first valve means being loose seating to permit a small flow of fluid upon being actuated to its closed position; a second valve means connected in said flowline downstream of said meter and operative between open and closed positions, said second valve means being tight seating to positively shut off the flow in the flowline upon being actuated to its closed position; a passageway around said second valve means and connected to said flowline with its upstream junction downstream of said meter, said passageway forming a by-pass for a small flow of fluid; a check valve in said passageway, said check valve being biased toward a closed position but operated to open by a predetermined upstream head pressure; means upstream of said meter to separate and eliminate gases from said flowline and having an air release valve actuable to open after accumulating a predetermined quantity of gas; and means responsive to a predetermined amount of entrained gas passing through said flowline to operate said first and second valve means; whereby the check valve will be closed when entrained gas is being bled from said flowline but is opened by the flowline pressure when said second valve means is closed and the flowline cannot be bled of entrained gases.

References Cited in the file of this patent
UNITED STATES PATENTS

| | | |
|---|---|---|
| 2,049,239 | Wilcox | July 28, 1936 |
| 2,124,681 | Jauch et al. | July 26, 1938 |
| 2,237,520 | Brubaker et al. | Apr. 8, 1941 |
| 2,276,838 | Grise | Mar. 17, 1942 |
| 2,330,703 | Grise | Sept. 28, 1943 |
| 2,693,196 | Hundley | Nov. 2, 1954 |
| 2,814,200 | Hills | Nov. 26, 1957 |